United States Patent
Kang

(10) Patent No.: US 7,071,998 B2
(45) Date of Patent: Jul. 4, 2006

(54) WHITE BALANCE REGULATING DEVICE AND METHOD THEREOF

(75) Inventor: Ho-woong Kang, Youngin (KR)

(73) Assignee: Samsung Electronics Co., Ltd. (KR)

( * ) Notice: Subject to any disclaimer, the term of this patent is extended or adjusted under 35 U.S.C. 154(b) by 574 days.

(21) Appl. No.: 10/438,011

(22) Filed: May 15, 2003

(65) Prior Publication Data

US 2003/0214606 A1   Nov. 20, 2003

(30) Foreign Application Priority Data

May 20, 2002   (KR)   ................ 2002-27934

(51) Int. Cl.
*H04N 9/73* (2006.01)
(52) U.S. Cl. .................... 348/655; 348/656
(58) Field of Classification Search ........... 348/655, 348/656, 657, 223.1; 358/516; 382/167; 345/690, 589; H04N 9/73
See application file for complete search history.

(56) References Cited

U.S. PATENT DOCUMENTS

| 5,400,086 A | * | 3/1995 | Sano et al. | ............. 348/655 |
| 5,657,098 A | * | 8/1997 | Ando et al. | ............. 348/655 |
| 6,429,905 B1 | * | 8/2002 | Yamamoto | ............. 348/656 |

* cited by examiner

*Primary Examiner*—Sherrie Hsia
(74) *Attorney, Agent, or Firm*—Sughrue Mion, PLLC

(57) ABSTRACT

Disclosed is a white balance regulating device, including a cut-off value adjusting portion for adjusting and outputting a cut-off value of an analog image signal which is input as a first pattern; an A/D converter for converting the analog image signal, in which the cut-off value is adjusted, into a digital image signal; a detecting portion for detecting a least significant bit of each tristimulus value of the digital image signal; a controlling portion for upwardly regulating a level of a variable register of the cut-off value adjusting portion from a level corresponding to a preset first initial cut-off value until the least significant bit becomes different from the first initial cut-off value and setting the level of the variable register just before the least significant bit becomes different from the first initial cut-off value as a first cut-off value; and a storing portion for storing the first cut-off value.

11 Claims, 2 Drawing Sheets

WHITE BALANCE REGULATING DEVICE AND METHOD THEREOF

BACKGROUND OF THE INVENTION

1. Field of the Invention

The present invention relates to a white balance regulating device and a method thereof, particularly, to a white balance regulating device which regulates a cut-off point and a saturation point of a digital display, such as a liquid crystal display (LCD) and a plasma display panel (PDP), etc., and a method thereof. The present application is based on Korean Patent Application No. 2002-27934, which is incorporated herein by reference.

2. Description of the Related Art

In order to display an analog image signal input from an external apparatus on a digital display such as an LCD and a PDP, etc., the analog image signal has to be converted into a digital image signal. Therefore, it is important to match black level and white level of the analog image signal input from the external apparatus with a digital value of the digital image signal.

Therefore, in order to fully reproduce a color of an image, the digital display used in a TV or a monitor, etc. sets a cut-off point for regulating a balance of a red, green and blue (RGB) color signal in the black level which emits a dim light, and adjusts a saturation point for regulating the balance of the RGB color signal in the white level which emits a strong light.

FIG. 1 is a block diagram showing a conventional white balance regulating device.

Referring to FIG. 1, a white balance regulating device comprises a level regulating portion 100, an A/D converter 110, a data detecting portion 120, a controlling portion 130 and a displaying portion 140. The level regulating portion 100 variably regulates a level of a variable register to set the cut-off point and the saturation point of the RGB color signal input from the external apparatus. The A/D converter 110 converts an analog RGB color signal output from the level regulating portion 100 into an 8-bit digital signal.

The data detecting portion 120 detects all the data of the 8-bit digital RGB color signal. The controlling portion 130 compares all the data of the 8-bit digital RGB color signal detected from the data detecting portion 120 with predetermined standard data, and then controls the level regulating portion 100 so as to regulate the variable register according to the compared result. The displaying portion 140 receives a signal output from the data detecting portion 120, and drives a liquid crystal to display on a screen.

For example, the controlling portion 130 initializes the cut-off point to a desired data 0x00 so as to regulate the cut-off point of the RGB color signal input from the external apparatus. Further, after initializing the cut-off point, the controlling portion 130 sets the variable register of the level regulating portion 100 to a desired value to perform a regulation of the cut-off point. The controlling portion 130 compares the 8-bit data of the RGB color signal detected by the data detecting portion 120 with desired data.

If the data detected by the data detecting portion 120 is equal to the desired data, the controlling portion 130 controls the level regulating portion 100 to gradually increase the level of the variable register until obtaining an optimal cut-off point. The level regulating portion 100 regulates the level of the variable register according to a control signal of the controlling portion 130. If the 8-bit data of the RGB color signal read through the regulated variable register of the level regulating portion 100 is larger than the desired data, the corresponding level of the variable register is set as the cut-off point.

In order to set a saturation point, the saturation point is initialized to a desired data 0xFF. After setting the variable register to a desired value, the controlling portion 130 compares the RGB signal read through the data detecting portion 120 with the initialized data.

If the data detected by the data detecting portion 120 equals the desired data, the controlling portion 130 controls the level regulating portion 100 to gradually reduce the level of the variable register until obtaining an optimal saturation point. The level regulating portion 100 regulates the level of the variable register according to a control signal of the controlling portion 130. If each data corresponding to the RGB color signal read through the regulated variable register of the level regulating portion 100 is smaller than the desired data, the corresponding level of the variable register is set as the saturation point.

However, in the conventional white balance regulating device, since the data detecting portion 120 has to read all the 8-bit digital data corresponding to each digital RGB color signal output through the A/D converter 110, there is a problem that a circuit construction of the white balance regulating device becomes complicated.

In addition, if the cut-off point and the saturation point are not optimized, when the input analog image signal is converted into the digital image signal, a signal distortion phenomenon occurs, whereby an image signal corresponding to a dark portion is cut off, and thus is not displayed, or an image signal corresponding to a bright portion is saturated, and thus is not displayed.

SUMMARY OF THE INVENTION

The present invention has been developed in order to solve the above problems in the prior art. Accordingly, an object of the present invention is to provide a white balance regulating device which is for optimally setting a cut-off point and a saturation point of each RGB color signal with respect to an image signal input to an LCD apparatus and a PDP apparatus, thereby minimizing a quantization loss occurring during an analog image signal-to-digital image signal converting process and improving a color reproduction ability, and a method thereof.

To solve the above problem, a white balance regulating device according to the present invention comprises a cut-off value adjusting portion for adjusting and then outputting a cut-off value of an analog image signal which is input in the form of a first pattern; an A/D converter for converting the analog image signal, in which the cut-off value is adjusted, into a digital image signal; a detecting portion for detecting a least significant bit of each tristimulus value of the digital image signal; a controlling portion for upwardly regulating a level of a variable register of the cut-off value adjusting portion from a level corresponding to a preset first initial cut-off value until the least significant bit becomes different from the first initial cut-off value and setting the level of the variable register just before the least significant bit becomes different from the first initial cut-off value as a first cut-off value; and a storing portion for storing the first cut-off value.

When the analog image signal in the form of a second pattern is input to the cut-off value adjusting portion, the controlling portion downwardly regulates the level of the variable register from a level corresponding to a preset second initial cut-off value until the least significant bit becomes different from the second initial cut-off value, and sets a level of the variable register just before the least significant bit becomes different from the second initial cut-off value as a second cut-off value, and the second cut-off value is stored in the storing portion.

Preferably, the white balance regulating device further comprises a pattern generating portion for generating a first and second pattern of the analog image signal, wherein the controlling portion controls the pattern generating portion to generate the first pattern when setting the first cut-off value and generate the second pattern when setting the second cut-off value. Here, the first pattern is a black pattern, and the second pattern is a white pattern.

In addition, the level of the variable register corresponding to the first initial cut-off value is 0x00, and the level of the variable register corresponding to the second initial cut-off value is 0xFF.

Preferably, the white balance device further comprises a rectifying filter for removing a noise component included in the digital image signal output through the A/D converter, wherein the detecting portion detects the least significant bit of each tristimulus value of the digital image signal in which the noise component is removed. Further, the detecting portion can detect a higher bit that is one step higher than the least significant bit of each tristimulus value of the digital image signal.

To solve another problem, a method of regulating white balance according to the present invention comprises steps of setting a level of a variable register to a level corresponding to a first initial cut-off value; adjusting and outputting a cut-off value of an analog image signal which is input in the form of a first pattern; converting the analog image signal output through the variable register into a digital image signal; comparing a least significant bit corresponding to each tristimulus value of the digital image signal with the first initial cut-off value; and upwardly regulating the level of the variable register, wherein the converting step or the upwardly regulating step is repeatedly performed until the least significant bit becomes different from the first initial cut-off value, and the level of the variable register just before the least significant bit becomes different from the first initial cut-off value is set as a first cut-off value.

Preferably, the method further comprises steps of setting the level of the variable register to a level corresponding to a second initial cut-off value; adjusting and outputting the cut-off value of the analog signal which is input in the form of a second pattern; converting the analog image signal output through the variable register into the digital image signal; comparing the least significant bit corresponding to each tristimulus value of the digital image signal with the second initial cut-off value; and downwardly regulating the level of the variable register, wherein the converting step or the upwardly regulating step is repeatedly performed until the least significant bit becomes different from the second initial cut-off value, and the level of the variable register just before the least significant bit becomes different from the second initial cut-off value is set as a second cut-off value.

Here, the first pattern is a black pattern, and the second pattern is a white pattern. Further, the level of the variable register corresponding to the first initial cut-off value is 0x00, and the level of the variable register corresponding to the second initial cut-off value is 0xFF.

According to the present invention, since the first and second cut-off points are regulated using only the least significant bit corresponding to each RGB color signal, a circuit construction thereof is simple. In addition, since the analog image signal input from an external apparatus is converted into the digital image signal within an extent of the first cut-off point and second cut-off point, a signal distortion phenomenon is minimized. Since a display extent of a digital display is maximized, color reproduction ability is improved.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Now, preferred embodiments of the present invention will be described in detail with reference to the attached drawings.

Figure 1:
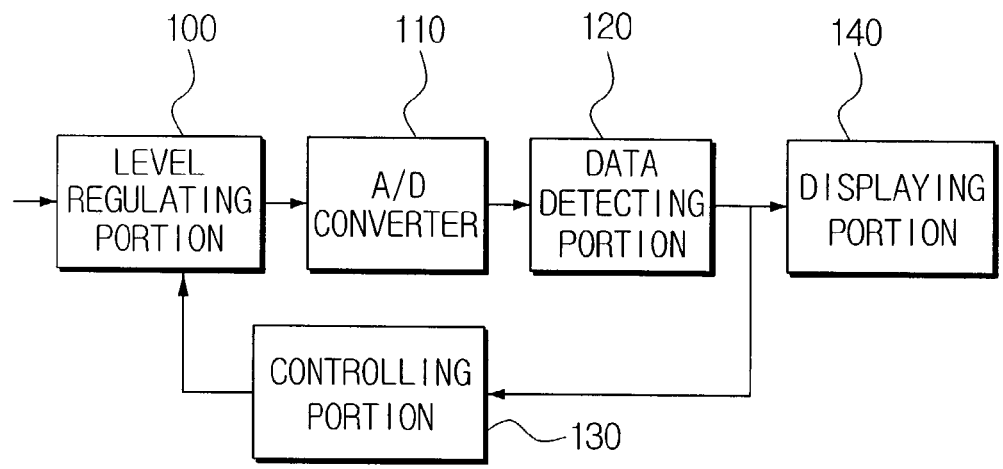
FIG. 1 is a block diagram showing a construction of a conventional white balance regulating device.
Figure 2:
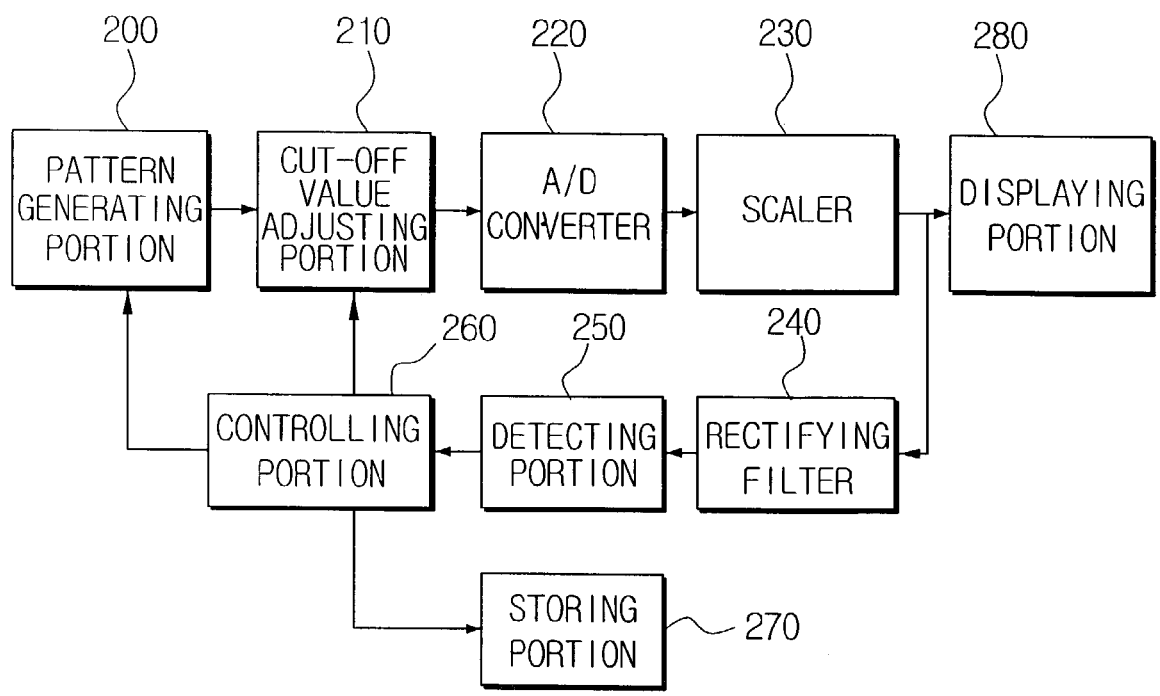
FIG. 2 is a block diagram showing a construction of a white balance regulating device according to one embodiment of the present invention.

FIG. 2 is a block diagram showing a construction of a white balance regulating device according to one embodiment of the present invention.

Referring to FIG. 2, a white balance regulating device comprises a pattern generating portion 200, a cut-off value adjusting portion 210, an A/D converter 220, a scaler 230, a rectifying filter 240, a detecting portion 250, a controlling portion 260, a storing portion 270 and a displaying portion 280.

The pattern generating portion 200 generates an analog image signal in the form of a first and second pattern according to a control signal of the controlling portion 260.

The cut-off value adjusting portion 210 adjusts and outputs a cut-off value of the analog image signal which is input in the form of the first pattern. Here, the first pattern is a black pattern, and the second pattern is a white pattern.

The A/D converter 220 converts the analog image signal output from the cut-off value adjusting portion 210 into a digital image signal.

The scaler 230 transforms the digital image signal in a frame unit so as to display on a screen of the displaying portion 240.

The rectifying filter 240 removes a noise component included in the digital image signal output through the scaler 230.

The detecting portion 250 detects a least significant bit of each tristimulus value (e.g., RGB color signal) of the digital image signal in which the noise component is removed by the rectifying filter 240.

The controlling portion 260 upwardly regulates a level of a variable register of the cut-off value adjusting portion 210 from a level corresponding to a preset first initial cut-off value until the least significant bit becomes different from the preset first initial cut-off value. The controlling portion 260 sets the level of the variable register just before the least significant bit becomes different from the preset first initial cut-off value as a first cut-off value. Here, the level of the variable register corresponding to the first initial cut-off value is 0x00.

When the analog image signal in the form of the second pattern is input to the cut-off value adjusting portion 210, the controlling portion 260 downwardly regulates the level of the variable register from a level corresponding to a preset second initial cut-off value until the least significant bit becomes different from the preset second initial cut-off value. The controlling portion 260 sets the level of the variable register just before the least significant bit becomes different from the preset second initial cut-off value as a second cut-off value. Here, the level of the variable register corresponding to the second initial cut-off value is 0xFF. The first and second cut-off values are stored in the storing portion 270. The displaying portion 280 receives an RGB color signal output from the scaler 230, and drives a liquid crystal to display on a screen. Here, the first cut-off value means a cut-off point as a point that light is about to be emitted, and the second cut-off value means a saturation point as a point that light becomes the brightest.

In order to set the first cut-off value of the input analog image signal, the controlling portion 260 controls the pattern generating portion 200 to apply the analog image signal input from an external apparatus in the form of the black pattern. Further, the controlling portion 260 controls the cut-off value adjusting portion 210 to set the variable register of the cut-off value adjusting portion 210 to the first initial cut-off value. The pattern generating portion 200 applies the analog image signal input from the external apparatus in the form of the black pattern according to a control signal of the controlling portion 260. The cut-off value adjusting portion 210 sets the level of the variable register to 0x00 according to the control signal of the controlling portion 260.

The A/D converter 220 converts the analog image signal output through the cut-off value adjusting portion 210 into a 8-bit digital image signal. RGB color signals of the digital image data output through the A/D converter 220 are respectively 8 bits, and thus 24 bits total. The scaler 230 transforms the digital image signal output through the A/D converter 220 in a frame unit so as to display on the screen of the displaying portion 240. Generally, since a resolution of a digital display such as an LCD or PDP, etc., is decided in a panel, the input image has to be transformed into a status which can be displayed on the digital display.

The rectifying filter 240 removes a noise component included in the 8-bit digital image signal output through the scaler 230. The detecting portion 250 detects the 8-bit digital image signal, in which the noise component is removed, i.e., a least significant bit corresponding to each RGB color signal. Further, considering an error, the detecting portion 250 may detect a higher bit in which one step is higher than the least significant bit as well as the least significant bit corresponding to each 8-bit RGB color signal output from the rectifying filter 240. Further, the detecting portion 250 can detect at least one bit out of four higher bits with respect to the 8-bit RGB color signal.

The controlling portion 260 compares the least significant bit corresponding to each RGB color signal detected by the detecting portion 250 with the first initial cut-off value, and then upwardly regulates the level of the variable register of the cut-off value adjusting portion 210 from the level corresponding to the first initial cut-off value until the least significant bit becomes different from the preset first initial cut-off value. The controlling portion 260 sets the level of the variable register just before the least significant bit becomes different from the first initial cut-off value as the first cut-off value.

For example, in case the least significant bit is changed from 0 to 1 while the level of the variable register is placed at each of 0x4F, 0x53 and 0x55, the levels of the variable register just before the least significant bit is changed from 0 to 1, i.e., 0x4E, 0x52, 0x54 are set as the first cut-off value.

The cut-off points 0x4E, 0x52, 0x54 with respect to each RGB color signal are stored in the storing portion 270. Therefore, after setting the first cut-off value, the variable register of the cut-off value adjusting portion 210 is set to the first cut-off value corresponding to each RGB color signal stored in the storing portion 270.

If the setting of the first cut-off value is completed, the controlling portion 260 controls the pattern generating portion 200 to apply the analog image signal input from the external apparatus in the form of the white pattern. Further, the controlling portion 260 controls the cut-off value adjusting portion 210 to set the level of the variable register of the cut-off value adjusting portion 210 to the second initial cut-off value. The pattern generating portion 200 applies the analog image signal input from the external apparatus in the form of the white pattern according to the control signal of the controlling portion 260. The cut-off value adjusting portion 210 sets the level of the variable register of the cut-off value adjusting portion 210 to the second initial cut-off value according to the control signal of the controlling portion 260. Here, the level of the variable register corresponding to the second initial cut-off value is 0xFF.

The A/D converter 220 converts the analog image signal output from the cut-off value adjusting portion 210 into the 8-bit digital image signal. The scaler 230 transforms the digital image signal output from the A/D converter 220 in a frame unit so as to display on the screen.

The rectifying filter 240 removes the noise component included in the 8-bit digital image signal output through the scaler 230. The detecting portion 250 detects the 8-bit digital image signal in which the noise component is removed by the rectifying portion 240, i.e., the least significant bit corresponding to each RGB color signal.

The controlling portion 260 compares the least significant bit corresponding to each RGB color signal detected by the detecting portion 250 with the second initial cut-off value, and then downwardly regulates the level of the variable register of the cut-off value adjusting portion 210 from 0xFF until the least significant bit becomes different from the preset second initial cut-off value. The controlling portion 260 sets the level of the variable register just before the least significant bit becomes different from the second initial cut-off value as the second cut-off value.

For example, in case the least significant bit is changed from 1 to 0 at the level of 0x56, 0x61 and 0x74, the levels of the variable register just before the least significant bit is changed from 1 to 0, i.e., 0x55, 0x60, 0x73 are set as the second cut-off value. The points 0x55, 0x60, 0x73 are stored as the saturation points with respect to each RGB color signal in the storing portion 270. Therefore, after setting the second cut-off value, the variable register of the cut-off value adjusting portion 210 is set to the second cut-off value corresponding to each RGB color signal stored in the storing portion 270. The cut-off value adjusting portion 210 is divided into variable registers for respectively setting the first cut-off value and the second cut-off value.

Figure 3:
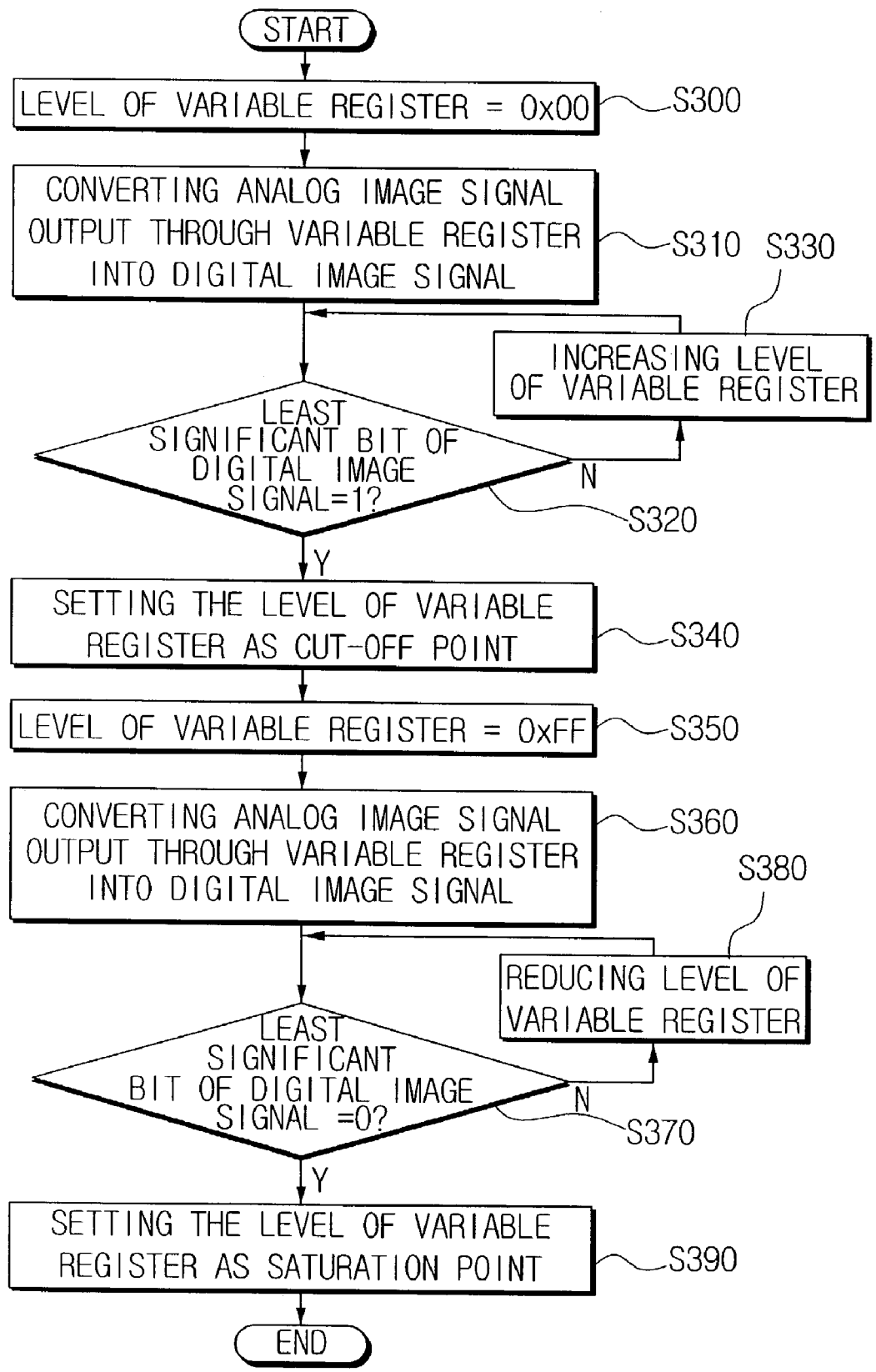
FIG. 3 is a flow chart showing a method of regulating white balance according to the present invention.

FIG. 3 is a flow chart showing a method of regulating white balance according to the present invention.

Referring to FIG. 3, in order to set the cut-off point of the analog image signal input from the external apparatus, the controlling portion 260 initializes the level of the variable register of the cut-off regulating portion 210 to 0x00 (S300). The controlling portion 260 controls the pattern generating portion 200 to input the analog image signal in the form of the black pattern. The pattern generating portion 200 applies the analog image signal in the form of the black pattern according to the control signal of the controlling portion 260.

The cut-off regulating portion 210 regulates and then outputs the cut-off value of the analog image signal which is input in the form of the black pattern. The A/D converter 220 converts the analog image signal/output from the cut-off regulating portion 210 into the digital image signal (S310).

The scaler 230 transforms the digital image signal output through the A/D converter 220 to display on the screen of the displaying portion 280. The rectifying filter 240 removes the noise component included in the digital image signal output through the scaler 230. The detecting portion 250 detects the least significant bit corresponding to each RGB color signal in which the noise component is removed. The controlling portion 260 compares the least significant bit corresponding to each RGB color signal detected by the detecting portion 250 with 0x00 (S320).

As a result of the comparison in the S320 process, if the least significant bit corresponding to each RGB color signal is not changed, i.e., the least significant bit is equal to the value of 0x00, the controlling portion 260 upwardly regulates the level of the variable register of the cut-off regulating portion 210 (S330). The controlling portion 260 repeatedly performs the S330 process until the least significant bit of each RGB color signal output from the S330 process becomes different from the first initial cut-off value, i.e. until the least significant bit corresponding to each RGB color signal detected by the detecting portion 250 is changed from 0 to 1.

As a result of the S320 process or a result of repeatedly performing the S330 process, if the least significant bit of each RGB color signal is 1, the controlling portion 260 sets the level of the variable register just before the least significant bit becomes 1 as the first cut-off value (S340).

As described above, if the regulating of the first cut-off value is completed, the controlling portion 260 initializes the level of the variable register of the cut-off value adjusting portion 210 to 0xFF in order to regulate the saturation point (S350). The controlling portion 260 controls the pattern generating portion 200 to input the analog image signal from the external apparatus in the form of a white pattern. The pattern generating portion 200 applies the analog image signal in the form of the white pattern according to the control signal of the controlling portion 260.

The cut-off value adjusting portion 210 regulates and outputs the analog image signal which is input in the form of the white pattern. The A/D converter 220 converts the analog image signal output through the variable register into the digital image signal (S360). The scaler 230 transforms the digital image signal output through the A/D converter 220 to display on the screen of the displaying portion 280. The rectifying filter 240 removes the noise component included in the digital image signal output through the scaler 230.

The detecting portion 250 detects the least significant bit corresponding to each RGB color signal in which the noise component is removed by the rectifying filter 240. The controlling portion 260 compares the least significant bit corresponding to each RGB color signal detected from the detecting portion 250 with 0xFF (S370).

As a result of the comparison in the S370 process, if the least significant bit corresponding to each RGB color signal detected by the detecting portion 250 is not changed, i.e., the least significant bit is equal to the preset first initial cut-off value, the controlling portion 260 downwardly regulates the level of the variable register of the cut-off value adjusting portion 210. The controlling portion 260 repeatedly performs the S380 process until the least significant bit of each RGB color signal output through the S380 process becomes different from the second initial cut-off value.

As a result of the S370 process or a result of repeatedly performing the S380 process, if the least significant bit of each RGB color signal detected from the detecting portion 250 is 0, the controlling portion 260 sets the level of the variable register just before the least significant bit becomes different from the second initial cut-off value as the second cut-off value (S390). That is, the level of the variable register just before the least significant bit is changed from 1 to 0 is set as the second cut-off value.

If the setting of the first and second cut-off values is completed, the variable register of the cut-off adjusting portion 210 is set to the first and the second cut-off value. Then, the analog signal input from the external apparatus is converted into a digital value within a range from the first cut-off value to the second cut-off value set in the cut-off value adjusting portion 210.

According to the white balance regulating device and the method thereof, when the analog image signal input from the external apparatus is converted into the digital image signal, the analog signal is converted into the digital value within a displaying extent of the digital display. Therefore, a signal distortion phenomenon is prevented, whereby an image signal corresponding to a dark portion is cut off and thus is not displayed, or an image signal corresponding to a bright portion is saturated and thus is not displayed. Since the displaying extent of the digital display is used maximally, quantization loss can be minimized, and color reproduction ability can be maximized.

Further, since the level of the variable register is regulated after confirming the least significant bit corresponding to each RGB color signal, the white balance regulating device has a simple circuit construction and can be easily applied. In addition, regardless of a signal processing device of the display, such as the scaler, the present invention can be applied to various display models in the same regulating method.

While the present invention has been described in detail, it should be understood that various changes, substitutions and alterations could be made hereto without departing from the spirit and scope of the invention as defined by the appended claims.

What is claimed is:

1. A white balance regulating device, comprising:
   a cut-off value adjusting portion for adjusting and then outputting a cut-off value of an analog image signal which is input in the form of a first pattern;
   an A/D converter for converting the analog image signal, in which the cut-off value is adjusted, into a digital image signal;
   a detecting portion for detecting a least significant bit of each tristimulus value of the digital image signal;
   a controlling portion for upwardly regulating a level of a variable register of the cut-off value adjusting portion from a level corresponding to a preset first initial cut-off value until the least significant bit becomes different from the first initial cut-off value, and setting the level of the variable register just before the least significant bit becomes different from the first initial cut-off value as a first cut-off value; and
   a storing portion for storing the first cut-off value.

2. The device of claim 1, wherein, when the analog image signal in the form of a second pattern is input to the cut-off value adjusting portion, the controlling portion downwardly regulates the level of the variable register from a level corresponding to a preset second initial cut-off value until the least significant bit becomes different from the second initial cut-off value, and sets a level of the variable register just before the least significant bit becomes different from the second initial cut-off value as a second cut-off value, and the second cut-off value is stored in the storing portion.

3. The device of claim 2, further comprising a pattern generating portion for generating a first pattern and a second pattern with respect to the analog image signal, wherein the controlling portion controls the pattern generating portion to generate the first pattern when setting the first cut-off value and generate the second pattern when setting the second cut-off value.

4. The device of claim 2, wherein the first pattern is a black pattern, and the second pattern is a white pattern.

5. The device of claim 2, wherein the level of the variable register corresponding to the first initial cut-off value is 0x00, and the level of the variable register corresponding to the second initial cut-off value is 0xFF.

6. The device of claim 1, further comprising a rectifying filter for removing a noise component included in the digital image signal output through the A/D converter, wherein the detecting portion detects the least significant bit of each tristimulus value of the digital image signal in which the noise component is removed.

7. The device of claim 6, wherein the detecting portion detects a higher bit that is one step higher than the least significant bit of each tristimulus value of the digital image signal.

8. A method of regulating a white balance, comprising:
setting a level of a variable register to a level corresponding to a first initial cut-off value;
adjusting and outputting through the variable register a cut-off value of an analog image signal which is input in the form of a first pattern;
converting the cut-off value of the analog image signal output through the variable register into a digital image signal;
comparing a least significant bit corresponding to each tristimulus value of the digital image signal with the first initial cut-off value; and
upwardly regulating the level of the variable register,
wherein the converting step to the upwardly regulating step is repeatedly performed until the least significant bit becomes different from the first initial cut-off value, and the level of the variable register just before the least significant bit becomes different from the first initial cut-off value is set as a first cut-off value.

9. The method of claim 8, further comprising:
setting the level of the variable register to a level corresponding to a second initial cut-off value;
adjusting and outputting through the variable register the cut-off value of the analog signal which is input in the form of a second pattern;
converting the cut-off value of the analog image signal output through the variable register into the digital image signal;
comparing the least significant bit corresponding to each tristimulus value of the digital image signal with the second initial cut-off value; and
downwardly regulating the level of the variable register,
wherein the converting step to the upwardly regulating step is repeatedly performed until the least significant bit becomes different from the second initial cut-off value, and the level of the variable register just before the least significant bit becomes different from the second initial cut-off value is set as a second cut-off value.

10. The method of claim 9, wherein the first pattern is a black pattern, and the second pattern is a white pattern.

11. The method of claim 9, wherein the level of the variable register corresponding to the first initial cut-off value is 0x00, and the level of the variable register corresponding to the second initial cut-off value is 0xFF.

* * * * *